Oct. 11, 1927.
J. J. JENSEN
1,645,505
MACHINE FOR CASTING CHOCOLATE
Filed Oct. 12, 1926    5 Sheets-Sheet 1
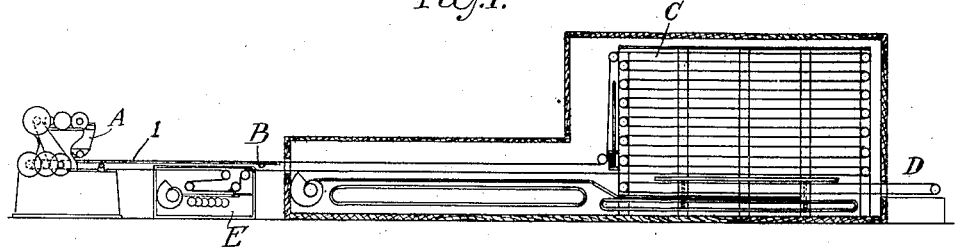
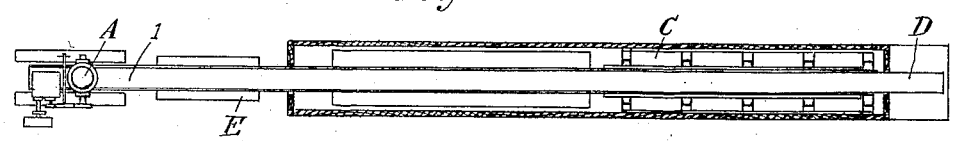
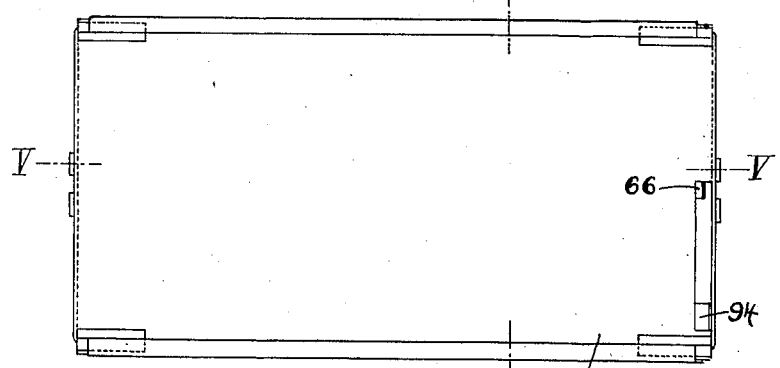
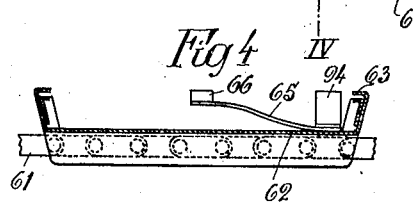
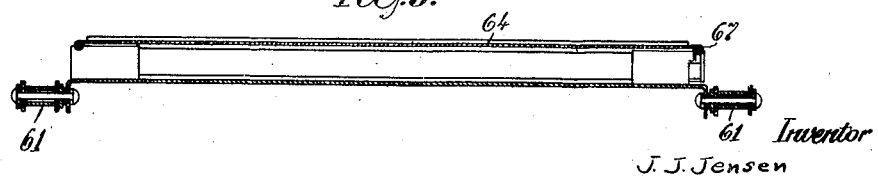
Inventor
J. J. Jensen
By: Marks & Clerk
Attys.

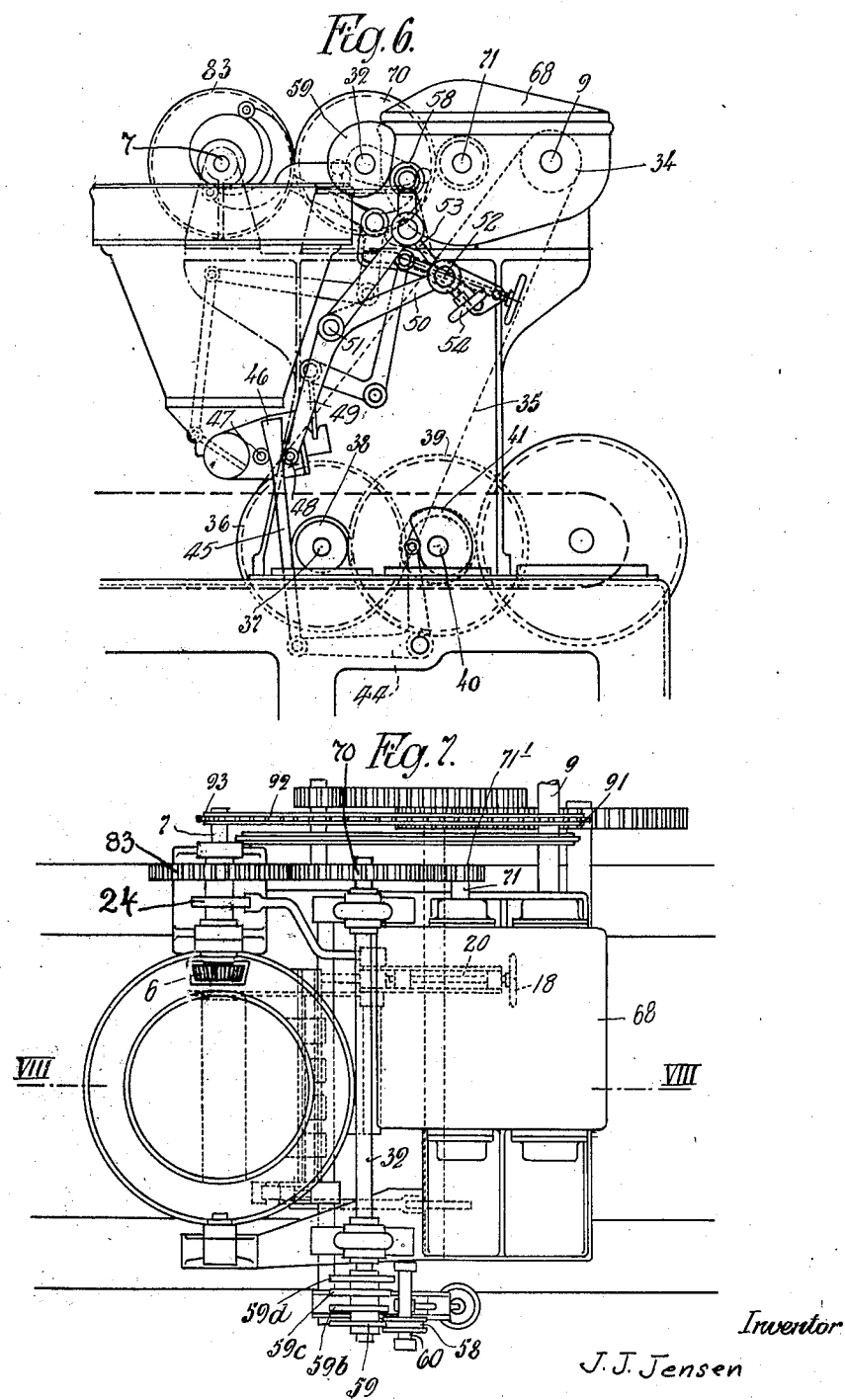

Oct. 11, 1927.

J. J. JENSEN 1,645,505

MACHINE FOR CASTING CHOCOLATE

Filed Oct. 12, 1926    5 Sheets-Sheet 3

Inventor
J. J. Jensen
By: Marks & Clerk
Attys.

Oct. 11, 1927.
J. J. JENSEN
1,645,505
MACHINE FOR CASTING CHOCOLATE
Filed Oct. 12, 1926
5 Sheets-Sheet 4
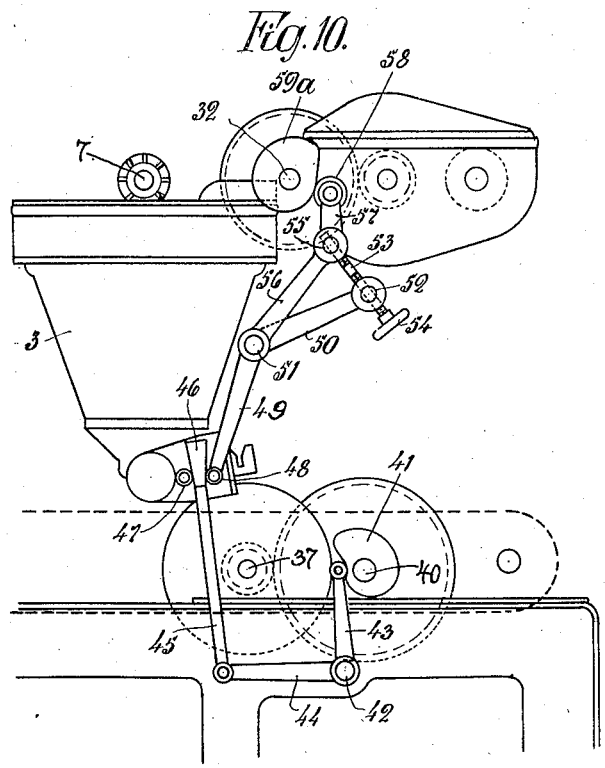
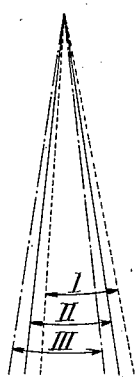
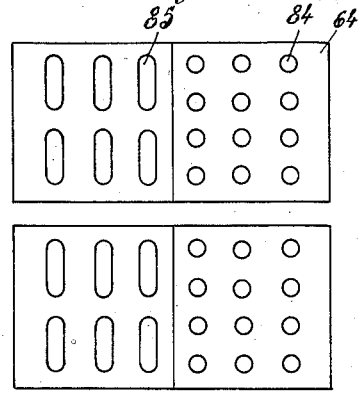
Inventor
J. J. Jensen
By: Marks & Clerk
Attys.

Patented Oct. 11, 1927.

1,645,505

UNITED STATES PATENT OFFICE.

JENS JOHANNES JENSEN, OF COPENHAGEN, DENMARK, ASSIGNOR TO BØGGILD & JACOBSEN, OF COPENHAGEN, DENMARK.

MACHINE FOR CASTING CHOCOLATE.

Application filed October 12, 1926, Serial No. 141,215, and in Germany February 24, 1926.

The presently used machines for continuous casting of chocolate are subject to the drawback that a readjustment from one kind to another kind requires considerable mechanical changes, which consume much time. These machines are therefore not very practical and have been employed only at very large factories, where readjustment has not to be performed too often.

The present invention has for its object to render practicable the casting, in the same machine and only by a simple and quickly effected readjustment, of all different merchantable forms of solid chocolate ranging from chocolate pastilles, Napolitains etc. up to larger tablets, such as cakes of cooking chocolate, the manual operation being reduced to filling the casting hopper and removing the finished chocolates. The principal distinguishing feature of the invention consists partly in an arrangement of the attachment of the mould plates to the conveyor belt, whereby the said mould plates may easily be exchanged, and partly in special devices serving to operate intermittently the feeding pumps by means of which the chocolate mass may be squirted into the cavities of the mould, in such a manner that this intermittent motion may easily be readjusted not only according to the number of moulds in the same row on the same mould plate, but also according to the spaces between the mould plates. Mechanical devices are further provided to function so that the surface of the chocolate mass in the moulds may be plane and smooth, and finally devices are provided serving to remove the chocolates automatically from the machine after cooling.

The invention is illustrated in the accompanying drawings, wherein

Figure 8:
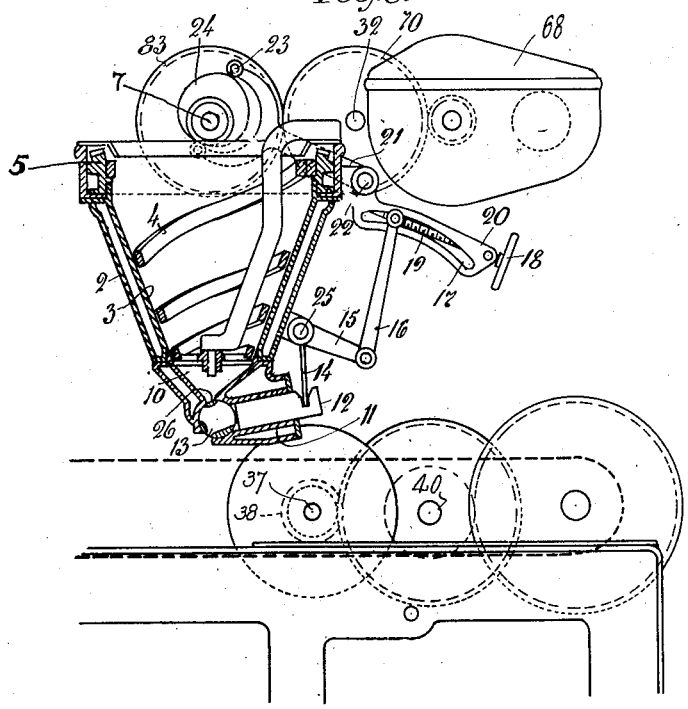
Figure 9:
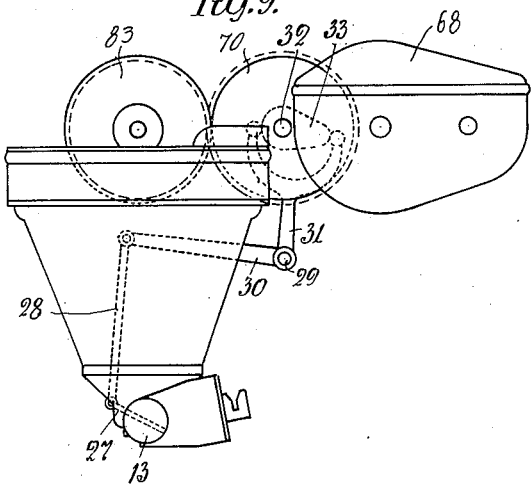
Figure 13:
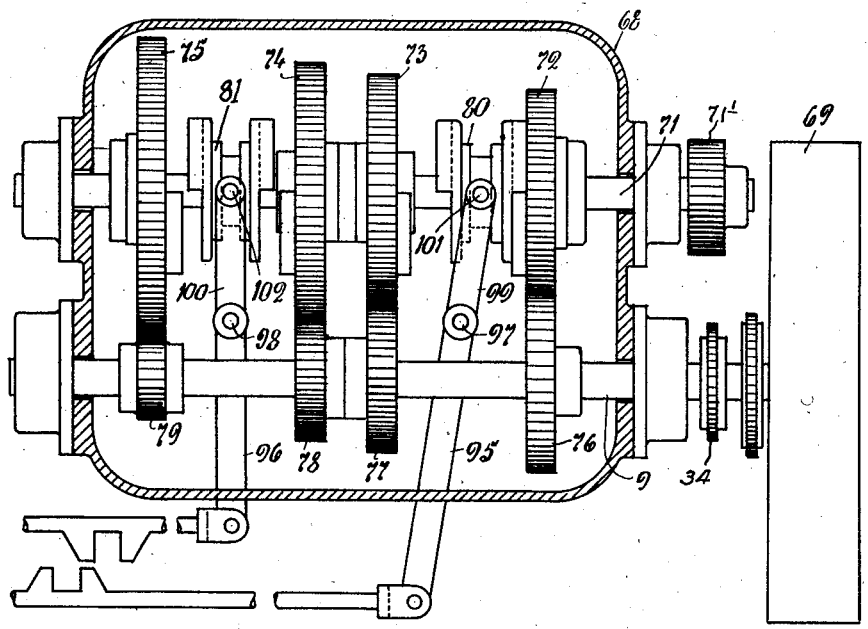
Figure 14:
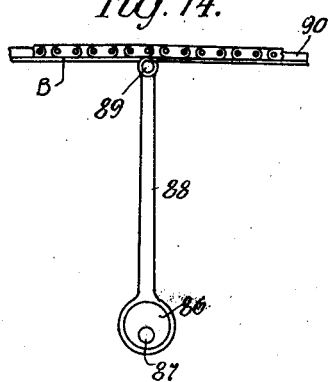

Fig. 1 is a diagrammatic representation of the entire machine, partly in vertical longitudinal section, Fig. 2 is a top view of the machine, Fig. 3 illustrates a mould-plate holder, Fig. 4 is a section along the line IV—IV in Fig. 3, Fig. 5 is a longitudinal section of the mould holder along the line V—V in Fig. 3 but with the mould plate inserted, Fig. 6 shows the feeding hopper with the feeding pumps, in side elevation, Fig. 7 is a top view of the hopper with the transmission members belonging thereto, Fig. 8 is a vertical section of the feeding hopper proper along the line VIII—VIII in Fig. 7, Fig. 9 shows the transmission members for the valve mechanism of the pumps, Fig. 10 shows the transmission members for the feeding hopper proper, Fig. 11 is a diagram showing the oscillations of the feeding hopper, Fig. 12 shows a mould plate with two different divisions, Fig. 13 shows a gearing device adapted to modify the number of pourings of the feeding hopper relatively to the motion of the conveyor belt, the figure showing a horizontal partial section of the mechanism, Fig. 14 shows, in side elevation, the device driving the vibratory rails.

The machine consists mainly of an endless conveyor belt 1 on to which the moulds are attached in the manner hereinafter described. This conveyor belt is moved past a feeder mechanism A, where the moulds are filled with chocolate. Thence the filled moulds are passed along a pair of vibrating rails B to a cooling chamber C, after passing through the chamber the chocolates are knocked out of the moulds and drop down on to a conveyor D. From here the moulds pass through a heating device E in order then to be filled again. The feeding mechanism A consists of a feeding hopper 3 axially pivoted concentric with a shaft 7 as indicated best in Figs. 7 and 9. This hopper is shown suspended and in, Fig. 8, surrounded by a heating jacket 2, which in known manner is fitted with a stirring worm 4 that is moved from the main shaft 9, Fig. 7, by means of a chain drive 91, 92, 93, the sprocket 93 being fixed on a shaft 7 with bevel pinion 6 co-operating with a toothed rim 5, which is horizontally disposed above the upper edge of the hopper, and to which the stirring worm 4 is attached.

The connection between the toothed rim 5 and the worm 4 is of such a nature that the worm may easily be detached from the toothed rim and lifted upward. This arrangement, however, does not form part of the present invention. The lower end of the hopper communicates with a bottom block or piece 10, and the latter has in its lower portion a number of pump cylinders 11 containing a corresponding number of pump pistons 12 and a rotary valve mechanism 13. The pistons 12 Fig. 8 are moved by means of a lever device 14, 15 and 16, the outer end of the lever 16 being pivoted to a sliding block adapted to travel in a slot 17 and to be displaced in the same by means of a screw-spindle 19 fitted with hand-wheel 18. The slot is arranged in an arm 20 which is firmly connected to another arm 21. The said arms are pivoted about a pin 22. The outer end of the arm 21 is forked and fitted with running rolls 23 co-operating with a cam disc 24 on the shaft 7. The pin 22 as well as a pin 25 about which the bell-crank lever 14, 15 is pivoted, are situated on the outside of the hopper 3, and consequently they partake in the oscillating motion of the same as hereinafter described. By the arrangement described, the cam disc 24, Fig. 8, when rotating, will cause the pistons 12 to be pushed back and forth in the pump cylinder 11, and even during the operation the length of stroke of the pistons may be varied by turning of the hand-wheel 18.

Between the cylinders 11 and discharge channels 26 of the bottom piece 10, there is inserted a cylinder valve 13 which is moved by means of a lever arm 27, Fig. 9, hinged to a connecting rod 28, the upper end of which is pivoted to an arm 30, Fig. 9, keyed to a shaft 29. To the same shaft there is attached another arm 31, the fork-shaped end of which co-operates with a cam disc 33 provided on a shaft 32.

The bottom block or piece 10 containing the pump cylinders 11, the pump pistons 12 and the rotary valve 13 as shown in Fig. 8 is detachable from the hopper 3, and may therefore easily be exchanged. Each bottom block contains a certain number of pumps and corresponding valves, depending upon the number of moulds in each row and the size of the moulds.

While the conveyor belt 1 is moving uniformly, the feeding hopper 3, Fig. 10, with the pumps and valve belonging thereto perform an oscillatory motion, chocolate mass being delivered by the pumps, by way of the valve, into the moulds of the mould plates during the oscillation of the feeding hopper.

As there may be a different number of moulds in the mould plates, and as the distance between the last row of moulds in one mould plate and the first row of forms in the following mould plate as a rule will be larger than the distance between the rows of moulds in the individual mould plate, special means must be provided, to equalize the difference in these distances. In Fig. 12 are shown some mould plates in top view. In the right hand half of the mould plates, round moulds are shown for casting of chocolate pastilles, and in the left hand half of the mould plates oblong moulds are shown for casting of cat's tongues. This arrangement is here shown merely by way of illustration, but in practice all the moulds in the same plate must of course be spaced similarly. It is evident that if pastilles are to be cast, the hopper during its forward motion, must follow the motion of the conveyor belt at the same speed, as the casting is to be effected in the shape of a drop. When casting other chocolates, for instance cat's tongues, on the contrary, the movements of the hopper must be slower than that of the conveyor belt during the pouring period, in order that chocolate mass poured may be dragged along the entire length of the recess. In order to utilize the mould plates as much as possible, the moulds are spaced as closely to each other as possible, and it will therefore be understood that the oscillation of the hopper must be able to be varied so as to correspond to the number of mould rows in the same mould plate as well as to the length of the individual moulds and, finally, so as to equalize the above mentioned differences in the distances between the rows of moulds.

On the main shaft 9 there is provided a sprocket wheel 34, Fig. 6, connected by means of a chain 35 to a sprocket wheel 36 on a shaft 37 which is journalled in the frame of the machine. On the said shaft 37 there is fixed a pinion 38 co-operating with a spur wheel 39 on a shaft 40 similarly journalled in the frame and supporting a cam disc 41, Figs. 6 and 10, which co-operate with a bell-crank lever 43, 44 pivoted about a pin 42 the lever is normally held against the cam disk in any convenient manner as by a spring (not shown), the other arm 44 of the said lever being hinged to a connecting rod 45, the upper end of which is fitted with a wedge 46 which on account of the rotation of the cam disc 41 will move up and down between a fixed guiding roll 47 attached to the bottom block and another guiding roll 48 provided at the end of a double-armed lever 49, 50 which is pivoted about a shaft 51 in the frame. The casting position, concerning which it should be noted that the discharge openings of the pumps are directed downward relatively to the recesses of the moulds, is adjusted by means of a nut 52 for a screw spindle 53 with hand-wheel 54, Fig. 10, provided at the end of the arm 50. The outer end of the said spindle 53 is threaded with threads of the opposite direction, and passes through another nut 55 in a lever 56, which is pivoted about the shaft 51. The outer end 57 of the lever 56 supports a roll 58 co-operating with one out of a number of cam discs $59^a$, $59^b$, $59^c$, $59^d$, Fig. 7. By the rotation of these cams, the roll 48 will be set into an oscillating motion about the shaft 51, the position of the angle of motion being adjusted by means of the hand-wheel 54. The oscillation of the roll 48 is transmitted to the hopper 3 by way of the wedge 46 and the roll 47.

The above mentioned cam discs 59$^a$, 59$^b$, 59$^c$ and 59$^d$ are similarly used in order to be able to vary the oscillation of the hopper 3.

The roll 58, Figs. 7 and 10, is adapted to slide on a shaft 60, in such a manner that the deflection of the hopper 3 will vary according to the shape of the one of the said cam discs 59$^a$, 59$^b$, etc. with which it has been adjusted to co-operate. By reason of this mechanism it becomes practicable to vary the length of mould covered by a poured round drop, and to cause it to assume an oblong shape, for instance in case of cat's tongues or a round shape in case of pastilles, etc.

In order to be able to vary the number of castings for each mould plate, on which as mentioned above there may be one, two, three up to five or six rows of moulds, there is provided a variable speed transmission device consisting of various co-operating gear wheels. This gear mechanism is shown in Fig. 13, and consists of a casing 68 in which there is journalled the main shaft 9 driven directly from a source of power by means of a belt and belt pulley 69, there being keyed on to the said shaft, inside of the casing 68, a number of gear wheels, four in all on the embodiment here shown. On another shaft 71 there are provided four loose gear wheels 72, 73, 74, 75, co-operating with the first mentioned fixed gear wheels 76, 77, 78 and 79. The loose gear wheels are separated, two and two, from one another by means of coupling discs 80 and 81 adapted to slide on the shaft 71. According to circumstances the two coupling discs 80 and 81 may be connected alternately to one or the other one of the gear wheels 72, 73, or 74, 75, as the case may be, by means of the rods 95 and 96, which are pivoted about the pins 97 and 98, and the fork-shaped ends of which are fitted with pins 101 and 102 resting in grooves in the coupling discs 80 and 81.

In the position shown in Fig. 13, the disc 80 is clutched on to the gear wheel 72, in such a manner that the shaft 71 will receive a rotation relatively to the shaft 9 and determined by the number of teeth on the gear wheels 76 and 72. The herein described arrangement is, made in order to secure not only the number of castings on each mould plate, but also to make sure that the castings will be effected at the proper point in the moulds, the shaft 71 being connected directly to pump pistons 12 by way of the gear wheel 70, Figs. 6 and 13, which is mounted on the shaft 32, Fig. 6, this gear wheel 70 is in direct engagement with a gear wheel 83 loose on the shaft 7 but rigidly connected to cam 24 as by a sleeve carried on the shaft 7 as shown best in Fig. 7, from which shaft the pump pistons, as mentioned above, receive their motion.

As mentioned above, the mould belt is continuous, and travels uniformly. It consists of two chains, shown in section on Fig. 5, where the chain links are marked 61. A number of these chain links 61 are firmly connected to a plate 62, with bent edges, see Figs. 3, 4 and 5, the top portion of the said plate forming holding edges 63 between which the mould plate 64 proper may be pushed and held in position against a fixed stop 94 by means of a plate spring 65, the hook-shaped end of which is adapted to engage the rear side of a moulding at the end of plate 64. The individual mould plate is fitted with recesses corresponding to the shape of the chocolates to be cast.

It will be understood that the exchange of these moulds in the mould holder may easily be effected, so that the mould belt of the machine may easily be adjusted from one chocolate mould to another one, simply by pulling the mould plates 64 out from the holder edges 63 and pushing other mould plates into position instead.

When the operation of the machine is to be described, it may be supposed at first that the machine is to be used for casting chocolate pastilles, and the mould plates 64 are all filled with moulds 84 of the kind shown in the right hand half of Fig. 12. In the construction shown, there are a certain arbitrary number of moulds in each row, and four rows on each mould plate.

The number of moulds 84 in each row must evidently correspond to the number of pouring mechanisms in the bottom piece 10, which bottom piece together with the pumps and valves belonging thereto may be exchanged, depending on the number of moulds in each row.

When the machine is to be used for casting chocolate pastilles in the continuously moved conveyor belt, the feeding hopper 3 while performing the pouring must have the same oscillatory speed as the moving conveyor belt, as only a round drop is to be poured. This adjustment of the feeding hopper is effected by moving the roller 58, Fig. 7, so far on the shaft 60 that the said roller comes into engagement with the cam discs 59$^a$, 59$^b$, 59$^c$, 59$^d$ which owing to its shape imparts to the feeding hopper an oscillation corresponding exactly to the speed of the conveyor belt. This oscillating motion is effected by means of the disc concerned 59$^a$, 59$^b$, 59$^c$, 59$^d$, Figs. 6 and 10, actuating during its rotation the system of levers 56, 50, 49, in such a manner that the arm 49, Fig. 10, will swing back and forth at exactly the desired speed. The end of the rod 49 supports as above described a roller 48 pressing against the wedge 46, which in its turn presses against a roller 47 provided on the bottom piece of the feeding hopper. Thereby the desired motion is imparted to the hopper, and in order to secure the pouring orifices coming exactly above the mould 84 during pouring, the gearing mechanism, Fig. 13, is adjusted exactly in such a manner that this will be the case. If for some reason or other the mould might get an oblique or faulty position, the latter may be adjusted nicely by turning the threaded spindle 53, Fig. 10, by means of the hand-wheel 54. Normally the division of the period of oscillation is calculated for instance from the first row of moulds in the one mould plate 64 to the corresponding first row in the following mould plate 64, but the said division, being four in the present case, cannot be uniform, the reason being that there is another space between the last row of moulds 84 in one mould plate 64 and the first row of moulds 84 in the following mould plate 64 other than the space between the rows of moulds in the same mould plate, and in order to equalize this difference a variation of oscillations is imparted to the feeding hopper by means of the wedge 46, Figs. 6 and 10, the said wedge, as described above, being slowly pulled downward owing to the motion of the cam disc 41, until the latter when a mould plate is passed by, has made one full rotation and, thereby, has caused the wedge 46 to be lifted up. In other words, for the passage of each mould plate below the feeding hopper, the wedge 46 is moved uniformly and slowly downward, and while the space between two mould plates passes the pouring orifices, the wedge is quickly moved upward to the initial position shown in Fig. 10.

The manner of action of this wedge will appear from the following:

Supposing the first row of moulds 84 in the mould plate 64 to have been filled, then the hopper 3 will be swung to the right, as shown in Fig. 10, and during the pouring operation it will swing towards the left following the motions of the mould belt. As now the mould belt has travelled forward one fourth of the distance between the two front rows of moulds in two consecutive mould plates, while the distance between the first and second row of moulds in the same mould plate is smaller than this distance, the feeding hopper 3 will have to perform its next oscillation to the left, beginning further to the left a distance corresponding to the above described space. This is graphically illustrated in Fig. 11, where the oscillation of the feeding hopper between the first and second row is marked I, while the oscillation between second and third row is marked II, and it will be seen from this that the said angle of oscillation is displaced relatively to the first angle. This displacement is effected by the downward motion of the wedge 46. Exactly the same process is repeated during filling of the fourth row of moulds 84, the angle of oscillation being here displaced on to three times the basic distance. During the subsequent passage of the space between two consecutive mould plates, the wedge 46 moves upward again, as described, in order then to repeat the working process for each mould plate.

The above described casting of pastilles must evidently be modified, as soon as the question is to cast oblong bodies, for instance cat's tongues. The corresponding moulds are marked 85, Fig. 12, and the number of rows of these moulds may evidently be smaller. On the mould plates drawn in Fig. 12, two rows are shown. Here too the wedge 46 must perform the function of equalizing the variations of distance, but the very length of the pourings must now also be varied, as well as the number of pourings on each mould plate. These requirements are met by retarding the angular velocity of the feeding hopper 3 in such a manner that during pouring the oscillation of the hopper will be slower than the motion of the conveyor belt. These adjustments are effected in the following manner:

As only two pourings are now to be made on to each mould plate, instead of four as heretofore described, the gear wheels 72, 73, 74 and 75 are readjusted in such a manner that another one of these is coupled to one of the discs 80 or 81, whereby the pump pistons will be caused to make another number of strokes, in the present case two for each mould plate, the strokes being performed as described above by the system of levers 21, 19, 16, 15, 14 actuated by the cam disc 24.

In order that the pouring may be lengthened, in such a manner that the oblong moulds 85 will become filled, the feeding hopper 3 as mentioned must not follow the velocity of the conveyor belt as before, but must swing more slowly, and this is effected by allowing the roller 58 to co-operate with the corresponding cam disc 59$^a$, 59$^b$, 59$^c$, 59$^d$, which in the above described manner will then impart to the feeding pumps the angular motion now corresponding to the motion of the conveyor belt.

The pumps move forward and backward at the same speed, and therefore when the hopper is standing still, and the mould belt is moving uniformly, the length of the pourings and the length of the spaces will be equal. When casting cat's tongues, plates etc. the length of the castings, however, will frequently be considerably longer than the space between the castings, and the oscillation of the feeding hopper 3 must therefore be very slight, and it may even happen that it has to be at a standstill during the pourings, or, in case of very long castings, that it gets a retrograte motion relatively to the direction of motion of the mould belt. Here too the variations of distances between the castings, is equalized by means of the previously described wedge 46, the motion of the latter being the same for all the various pourings.

From the above it will be seen that by a simple and easy adjustment the length of pouring may be adjusted within wide limits, in such a manner that it becomes practicable to cast in the same machine all the various shapes of chocolate occurring in the trade.

After the moulds have been filled by passing the above described feeding mechanism A, Fig. 1, they are moved along a pair of vibrating rails B, Fig. 14, each of which is moved by an eccentric 86 on a transverse shaft 87. These eccentrics co-operate with vertical rods 88 joined by means of a bolt 89, which is moved up and down by the eccentrics and, thereby, shake the two guiding rails 90 of the conveyor chains, the said rails in their turn transmitting the vibration to the moulds. Thence the moulds travel further on with the conveyor chain through the cooling closet C, until the moulds, top side down, arrive at another conveyor D, where the chocolates produced drop out of the moulds and down on to the conveyor, the moulds being tapped in otherwise known manner. From here the conveyor chain travels back to the feeding mechanism A, Fig. 1, passing on their way a heating closet E, in such a manner that the moulds, when they arrive below the feeding hopper, have a temperature corresponding essentially to that of the chocolate mass.

Having now described my invention, what I claim as new and desire to secure by Letters Patent is:—

1. In a machine for casting chocolate, an oscillatable hopper, oscillating means therefor, a pump attached to the hopper, a mold plate with molds therein, said mold plate being movable at a uniform speed below the pump, and means for adjusting the length of oscillations of the hopper.

2. A machine for casting chocolate as set forth in claim 1 wherein the hopper has a bottom piece detachable therefrom which sustains the pump connected to the hopper.

3. A machine for casting chocolate as set forth in claim 1 in which there is a bottom piece below the hopper containing a plurality of pump cylinders and pistons with means to operate the pistons to discharge the material from the hopper.

4. In a machine for casting chocolate as set forth in claim 1, in which the oscillating means for the hopper may be varied to correspond to the number of rows in each mold plate as well as the length of the individual molds.

5. A machine for casting chocolate as set forth in claim 1 in which the oscillating means for the hopper includes a number of cam discs with operating levers, and an adjustable wedge to transmit the oscillations to the hopper.

6. In a machine for casting chocolate as set forth in claim 1, means to equalize the difference in the distance between the rows of molds, said means consisting of a cam disc moved synchronously with the conveyor belt levers, and a wedge moved by the levers between a fixed stop and a roller to vary the oscillations of the hopper.

7. A machine for casting chocolate as set forth in claim 1, including a variable speed gear for operating the pump pistons at different rates of speed to correspond to the number of molds in each mold plate.

8. A machine for casting chocolate as set forth in claim 1, in which the mold plates are fixed to the molds by springs 65 and stops 94.

9. A machine for casting chocolates, comprising a hopper for holding the chocolate said hopper being oscillatable on a horizontal pivot, a uniformly movable conveyor with chocolate molds thereon beneath the hopper, means to regulate the flow of chocolate from the hopper and means for periodically moving the discharge portion of the hopper in correspondence with that of the conveyor.

In testimony whereof I affix my signature.

JENS JOHANNES JENSEN.